June 10, 1969  J. J. MULLION  3,449,001
ROTARY VACUUM UNION
Filed Aug. 8, 1966  Sheet 1 of 2
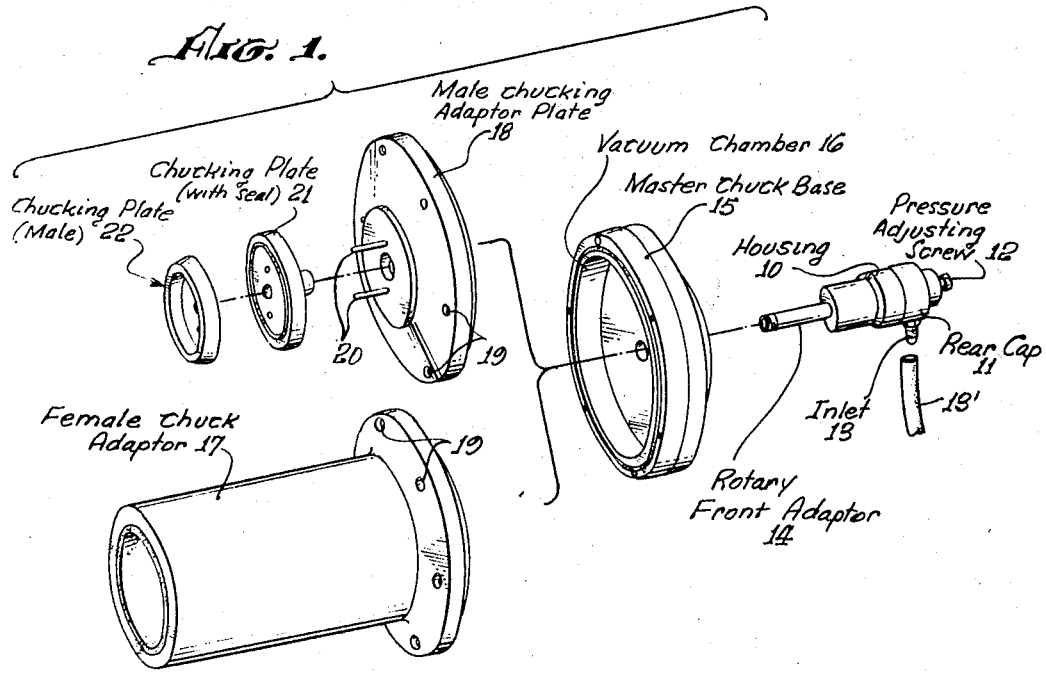
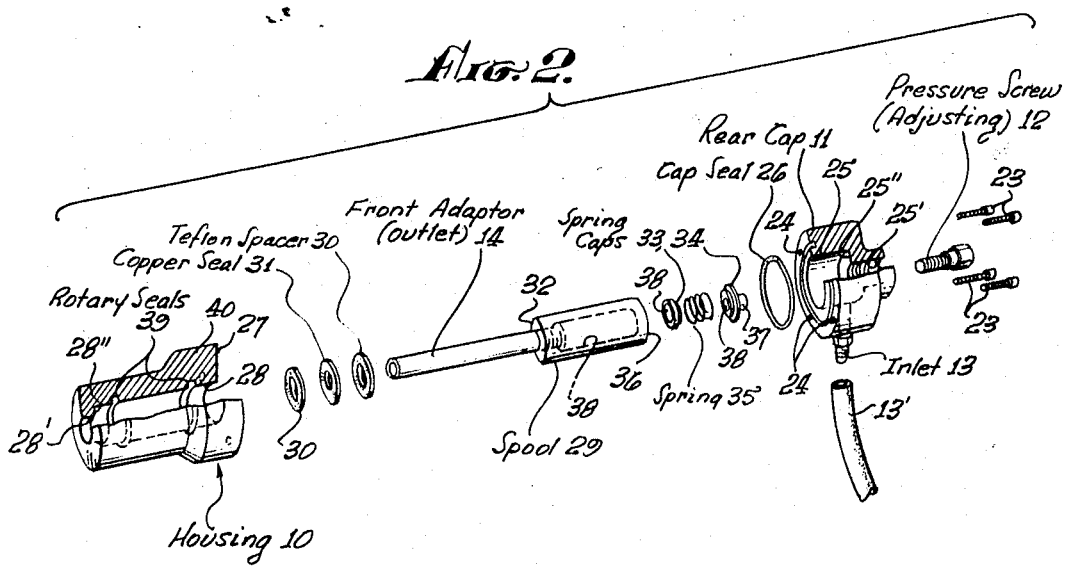
INVENTOR.
JOHN J. MULLION,
By L E Carnahan
AGENT June 10, 1969　　　J. J. MULLION　　　3,449,001
ROTARY VACUUM UNION Filed Aug. 8, 1966

INVENTOR.
JOHN J. MULLION

United States Patent Office

3,449,001
Patented June 10, 1969

3,449,001
ROTARY VACUUM UNION
John J. Mullion, Fullerton, Calif., assignor to General Dynamics Corporation, a corporation of Delaware
Filed Aug. 8, 1966, Ser. No. 570,985
Int. Cl. F16l 27/00, 27/08
U.S. Cl. 285—279    6 Claims

ABSTRACT OF THE DISCLOSURE

A rotary union which provides a connection capable of transmitting a vacuum pressure therethrough while connected to a rotating or oscillating body adapted for holding objects by means of the vacuum pressure.

---

The main function of the inventive vacuum rotary union is to provide an adequate means of transmitting vacuum pressure to a rotating or oscillating body, i.e., vacuum chucking, turntables, faceplates, etc. The vacuum rotary union can be used in manufacturing, inspection, research and development, and sources where the rotational movement of a vacuum connection is required. The simplicity of the present invention affords a low cost and an easily maintained rotary union.

Therefore, it is an objective of this invention to provide a rotary union.

A further object of the invention is to provide a rotary vacuum union.

Another object of the invention is to provide a rotary vacuum union capable of transmitting vacuum from a source to a moving body.

Other objects of the invention will be readily apparent to those skilled in the art from the following description and accompanying drawings wherein:

FIG. 1 is a partially exploded view illustrating an embodiment of the inventive rotary union in combination with a vacuum chuck assembly;

FIG. 2 is an exploded view, partially in cross-section of the FIG. 1 rotary union.

Figure 3:
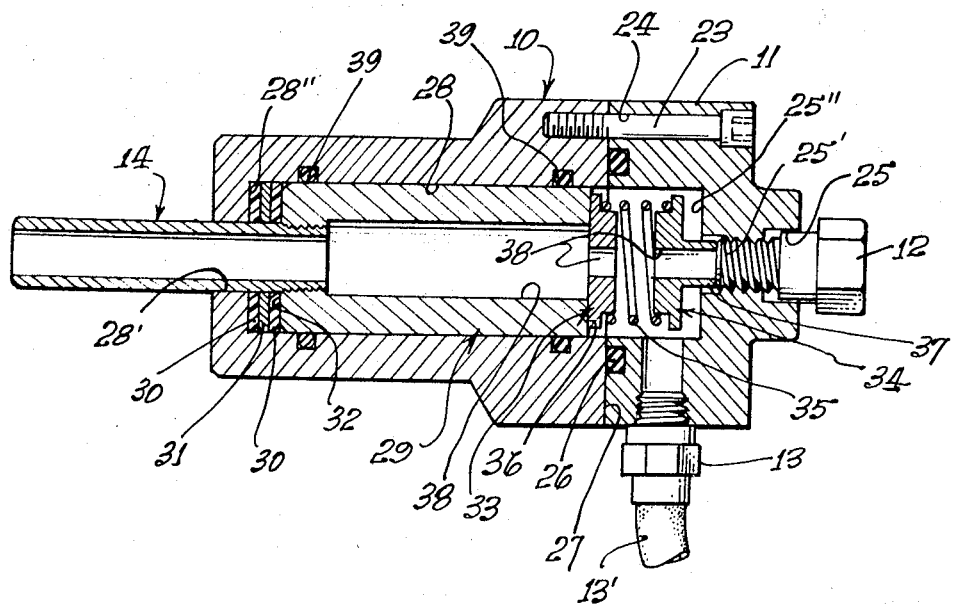
FIG. 3 is an enlarged cross-sectional view of the rotary union of FIG. 2 to illustrate all the parts of the union assembled together.

Broadly, the invention is directed to a device which transmits vacuum pressure to a moving body. The structure of the rotating vacuum union device is comprised essentially of a seal pressure adjusting screw threaded in a rear cap which in turn is connected to a housing element. The housing is oriented to receive a spool, into which a rotary front adaptor or outlet is inserted. The rotary front adaptor is threaded at both ends so that the rotating spool may transmit its motion to any suitable external attachment. Vacuum pressure is assured by providing a seal at either end of the spool and keeping the seals in compression by means of a spring. Any desired vacuum pressure may be obtained by adjusting a pressure screw mounted in the rear cap assembly. A cap seal is provided in the rear cap assembly for the purpose of joining the rear cap with housing. An inlet means is also constructed in engagement with the rear cap assembly whereby any inlet pressure which is to be transmitted to a rotating body may be admitted to the rotary vacuum union.

Referring now to the drawings, the inventive rotary union is illustrated in combination with a rotating vacuum chuck assembly. Generally, the rotary vacuum union comprises a housing 10, a rear cap 11 operatively connected to the housing 10, a seal pressure adjusting screw 12 mounted in rear cap 11 with an inlet connection 13 mounted in the side of the rear cap and connected to a hose 13' from a vacuum source (not shown), and a rotary front adaptor or outlet 14 extending from housing 10. The vacuum chuck generally comprises a master chuck base 15 defining a vacuum chamber 16. Base 15 is connected via adaptor 14 with the rotary union, and is adapted to support either a female chuck adaptor 17 or a male chuck adaptor plate 18 via means such as cap screws or the like (not shown) which extend through the apertures 19 in adaptors 17 and 18 and thread into base 15. The male chuck adaptor plate 18 is provided with dowels 20 which serve to align a front seal or chucking plate 21 and a chucking or locator plate 22 therewith for retaining a workpiece therein. Since the details of the vacuum chuck assembly, now Patent No. 3,236,533, do not constitute part of this invention a more complete description thereof is deemed unnecessary.

As shown in detail in FIGS. 2 and 3, the housing 10 is connected to rear cap 11 by screws 23 (only four shown) which extend through apertures 24 in cap 11 and are threadedly secured in housing 10. Rear cap 11 is also provided with a central aperture 25 and an annular groove througharound within which is located a cap seal 26 which abuts against the end wall 27 of housing 10. Housing 10 is provided with a central aperture 28 through which front adaptor 14 extends. Central aperture 25 is provided with a reduced diameter portion 25' which is threaded to accept the threads of seal pressure adjusting screw 12 and central aperture 28 includes a reduced diameter portion 28' which is of sufficient size to allow front adaptor 14 to extend therethrough. Threadedly secured to adaptor 14 is a rotatable spool 29 which is adapted to be positioned in the larger diameter portion of central aperture 28 of housing 10. A pair of spacer seals 30 constructed of Teflon, for example, separated by a seal 31 constructed of copper, for example, are adapted to abut end 32 of spool 29 and a shoulder 28" within housing 10 defined by the adjoining ends of the different diameter portions of aperture 28. A pair of springs caps 33 and 34, separated by a spring 35, are adapted to be positioned in central aperture 25 of rear cap 11 and in abutment with end 36 of spool 29 and a shoulder 25" within rear cap 11 defined by the adjoining ends of the different diameter portions of aperture 25. Spring cap 34 includes a reduced portion 37 which extends into the reduced diameter portion 25' of aperture 25 and abuts against pressure adjusting screw 12. Spring caps 33 and 34 and spool 29 are provided with apertures 38 which provide open communication between inlet 13 and front adapter 14 which is in open communication with vacuum chamber 16 of master chuck base 15 (see FIG. 1). The metallic spool 29 is adapted to rotate in housing 10 while spring 35 via rotating springs caps 33 and 34 supplies the pressure for the front seal 31. Spool 29 rotates in housing 10 and revolves inside of a pair of seals 39 contained within portion 40 of housing 10.

In operation, the front adaptor 14 and spool 29 are rotated by a power source via master chuck base 15, for example, while chamber 16 is connected to a vacuum source (not shown) via adaptor 14, spool 29, spring cap aperture 38, inlet 13 and hose 13', whereby a workpiece or the like can readily be held by either of the adaptors 17 or 18–22, for example. The rotary vacuum union thus provides the means of transmitting vacuum pressure to an object while it is in motion, i.e., rotational or oscillating.

Although a particular embodiment of the invention, and a specific application therefor, has been illustrated and described, modifications will be apparent to those skilled in the art, and it is intended to cover in the appended claims all such modifications as come within the true spirit and scope of the invention.

What I claim is:

1. A rotary union comprising a housing, a rear cap member, each of said housing and cap member having a central aperture having different diameter portions, means for securing said housing and cap member together, a rotatable spool means having an axial passageway therethrough located in the larger diameter portions of said central apertures of said housing and cap member, sealing means for said spool means supported by said housing, cap and spring means positioned in said central aperture of said cap member and in abutment with said spool means, said cap means having an axial hole extending therethrough in alignment with said axial passageway of said spool means to provide open communication from said central aperture of said cap member to said axial passageway of said spool means, adjustable means operatively mounted in the smaller diameter portion of said cap member aperture and adapted to vary the tension on said cap and spring means, inlet means mounted in said cap member and in communication with said central aperture thereof, an adaptor member having an axial passageway therethrough extending through the smaller diameter portion of said housing central aperture and operatively connected to said spool means, said adaptor member being adapted to be connected to an associated moving body and said inlet means being adapted to be connected to an associated source of pressure.

2. The rotary union defined in claim 1, wherein said sealing means includes at least one seal member positioned around said spool means and adjacent said housing, and a seal means positioned between said housing and the end of said spool means opposite said cap and spring means.

3. The rotary union defined in claim 2, wherein said seal means includes a pair of non-resilient spacers having a seal element therebetween.

4. The rotary union defined in claim 1, wherein said cap and spring means includes a pair of cap elements separated by a spring, one of said cap elements being provided with a reduced diameter portion which extends into said smaller diameter portion of said rear cap member central aperture and adapted to be contacted by said adjustable means.

5. The rotary union defined in claim 1, wherein said rear cap member is provided with a plurality of apertures axially aligned with said central apertures wherein said housing is provided with a plurality of threaded bores, and wherein said securing means comprises a plurality of threaded bolt-like members which extend through said plurality of apertures in said cap member and are threadedly inserted into said threaded bores of said housing.

6. The rotary union defined in claim 1, wherein said spool means passageway is partially provided with threads which are adapted to accept a threaded portion of said adaptor member.

References Cited

UNITED STATES PATENTS

| | | | |
|---|---|---|---|
| 2,101,937 | 12/1937 | Giberson | 285—279 X |
| 2,391,885 | 1/1946 | Shields | 285—279 X |
| 2,444,531 | 7/1948 | Richardson | 279—3 X |
| 2,836,439 | 5/1958 | Moore | 285—279 |
| 3,156,476 | 11/1964 | Roessler | 285—275 X |
| 3,236,533 | 2/1966 | Mullion | 279—3 |

ROBERT C. RIORDON, *Primary Examiner.*

J. C. PETERS, *Assistant Examiner.*

U.S. Cl. X.R.

279—3